United States Patent [19]

Hipwell et al.

[11] 4,110,897
[45] Sep. 5, 1978

[54] APPARATUS FOR AUTOMATICALLY CHANGING TOOL HEADS

[75] Inventors: Donald D. Hipwell, Mount Clemens; Klaus Rudolf Menzel, Orchard Lake, both of Mich.

[73] Assignee: Bendix Machine Tool Corporation, Warren, Mich.

[21] Appl. No.: 746,774

[22] Filed: Dec. 2, 1976

[51] Int. Cl.² .................................. B23Q 3/157
[52] U.S. Cl. .................................... 29/568
[58] Field of Search ........................ 29/568, 563

[56] References Cited

U.S. PATENT DOCUMENTS

| | | | |
|---|---|---|---|
| Re. 25,886 | 10/1965 | Cargill | 29/563 |
| 3,354,761 | 11/1967 | Sadier | 29/568 X |
| 3,509,619 | 5/1970 | Lipp | 29/568 |
| 3,708,051 | 1/1973 | Dato et al. | 29/563 X |
| 3,851,380 | 12/1974 | Kurimoto et al. | 29/568 |
| 3,858,286 | 1/1975 | Nohejl | 29/568 X |
| 3,895,427 | 7/1975 | Nakao et al. | 29/568 |
| 4,034,465 | 7/1977 | Shelton | 29/568 |

*Primary Examiner*—Gil Weidenfeld
*Attorney, Agent, or Firm*—Kenneth A. Seaman; Raymond J. Eifler

[57] ABSTRACT

A method and apparatus for automatically changing interchangeable machining tool heads carried by a tool carrier. The tool heads are suspended from an overhead trolleyway by leading and trailing trolleys, with the leading trolley carrying a probe and a vertical finger and the trailing trolley carrying an inclined guide. The vertical finger selectively engages a block carried on an overhead moving chain for moving the tool head toward the tool carrier. The probe extends in the direction of tool head travel and is responsive to proximity of the probe to the inclined guide of another tool head or to a pneumatically-actuated stop for disengaging the vertical finger from the chain. A shuttle bar assembly simultaneously loads and unloads tool heads from the tool carrier by engaging a block on each of the tool heads and moving the tool heads horizontally to loaded and unloaded positions. The tool carrier, carrying a tool head and a portion of removable trackway, moves horizontally from a tool head loading station for performing machining on a workpiece. The tool carrier includes coupling elements for removably clamping the tool head to the carrier and a drive mechanism for operating a plurality of tool work elements carried on the tool head.

19 Claims, 8 Drawing Figures

FIG.8

APPARATUS FOR AUTOMATICALLY CHANGING TOOL HEADS

BACKGROUND OF THE INVENTION

1. Field of the Invention

The present invention relates to machine tools. More particularly, this invention relates to an improved method and apparatus for automatically changing removable tool heads mounted on tool carrying unit. This invention has particular application to automatic machining units carrying a multi-spindle tool head for milling, drilling, tapping, boring or turning a workpiece held stationary at a work station, where the production rate of finished workpieces is advantageously at a low to medium production rate, approximately five to 30 finished pieces per machine per hour.

2. Description of the Prior Art

Other systems have been proposed for machining parts at the production rate of five to 30 finished pieces per hour. An automatic transfer machine could be used, but with its high capital cost is not economical for low or medium production.

A single-spindle, numerically-controlled machine is typically producing the finished workpieces where the production rate is up to five parts per hour range. A plurality of single-spindle, numerically controlled machines would be required to machine at the production rate of five to 30 finished pieces per hour. Such a plurality of machines requires a separate operator, a separate machine, and a separate floor space for each of the machines. Each machine is relatively slow, in that each tool must make multiple movements along the workpiece separately. Each machine also requires a separate workpiece setup. This system is expensive in terms of labor, capital and floor space, but has been used for the low and medium production machining for the lack of a suitable alternative.

Systems have been proposed which use multiple spindle tool heads with interchangeable tool heads. These systems are generally complex and cumbersome, frequently requiring considerable manipulation of the tool heads both into and out of the work station. Simultaneous movement of many tool heads required large forces to move the tool heads into the desired positions. The head changing process in these prior systems were slow, with the result that the machine time otherwise available for machining workpieces was spent instead nonproductively for changing tool heads.

The tool head changing machines of the prior art generally lack quick, precise positioning and alignment of the tool head with the tool carrier to provide a uniform seating of the tool head on the tool carrier.

Some tool head changing machines, such as U.S. Pat. No. 3,858,286 to Nohejl, lack means for cycling multiple tool heads to the tool carrier. Such a machine does not allow for rapid cycling of a plurality of tool heads.

In many prior art tool carrying machines, a single tool head is used at any one time, leaving the remainder of the tool heads idle. Considerable capital, invested in idle tool heads, would remain unused for a significant portion of the production time in such systems.

SUMMARY OF THE INVENTION

It is therefore an object of the present invention to overcome the foregoing limitations of the prior art and provide an inexpensive and efficient system for machining workpieces by performing sequentially machining operations such as milling, drilling, tapping, reaming, turning, boring and chamfering. The machining operations are carried out preferably with a plurality of multi-spindle tool heads carried one at a time on a tool carrier having a spindle drive coupling. Each tool head performs a single operation, with the spindles fixed in predetermined positions according to the desired machining on the workpiece. The tool heads are loaded in a queue, from which the first tool head is loaded onto the tool carrier for machining, unloaded after machining, and cycled to the end of the queue. During the unloading of the first tool head from the tool carrier, the next tool head is loaded onto the tool carrier. Each tool head in the queue is advanced by an overhead driven chain after the next tool head in front of it is moved away from its position.

It is another object of the present invention to provide an improved apparatus for changing the tool head carried on the tool carrier quickly while obtaining precise positioning and alignment of the tool head on the tool carrier. The quick change of tool heads allows maximization of productive machining time and minimization of idle time.

It is also an object of the present invention to minimize the amount of necessary manipulation of the tool heads during loading, unloading and advancing the queue of tool heads by maintaining each tool head in a uniform orientation while moving the tool head in translation.

Another object of the present invention is to minimize the peak force required to move the tool heads about a pathway. This object is achieved by reducing the friction in the moving element and the tool heads and by reducing the number of tool heads that are moving at any one time. The lower peak force requirement allows the use of smaller and less expensive drive motor for advancing each of the tool heads in the queue.

The apparatus for moving tool heads in the present invention further has the advantage that the spindles on the tool heads are accessible during the times when no machining is taking place with those tool heads. With the spindles accessible, the spindles can be examined for wear and breakage and repaired or replaced as necessary. The machine meanwhile may be working with another tool head.

A further object of the present invention is to provide optionally for the employment of otherwise idle tool heads. This object is achieved in one alternate embodiment by providing a plurality of tool carrying units spaced about the tool head pathway for simultaneously working on a plurality of workpieces, each of the tool carriers having one of the tool heads. The use of independently movable tool heads allows the working time of various operational types of tool heads, each performing one machining function to machine for its preselected time interval, independent of other tool heads without either delaying the other.

Additional tool heads can be easily added to accommodate a machining system requiring additional tool heads for machining by simply adding to the length of the tool head pathway. Spur and siding pathways can also be added to increase flexibility of the system.

The invention features a shuttle bar assembly 40 which simultaneously moves one tool head 20 from a tool carrier 50 while moving a second tool head 20 into the tool carrying unit. This invention also features an asynchronous, accumulating trolley system 30 for carrying the tool heads 20 along a trackway 12 from discharge station 94 to a loading station 93. A further feature of the trolley system is that a leading trolley 31 on each tool head 20 carries a probe 36 for sensing if the trackway in the direction of travel is clear, and if so, engage the moving chain 15 to move a trolley carrying a tool head along the trackway until another tool head 20 or a trackway stop 171, 172 is encountered. Upon encountering such a tool head, the probe 36 causes the tool head 20 to disengage from the moving chain 15.

The above and other objects and features of this invention will become apparent from the following detailed description, taken in conjunction with the accompanying drawings and claims which form a part of this specification.

DETAILED DESCRIPTION OF THE DRAWINGS

Figure 1:
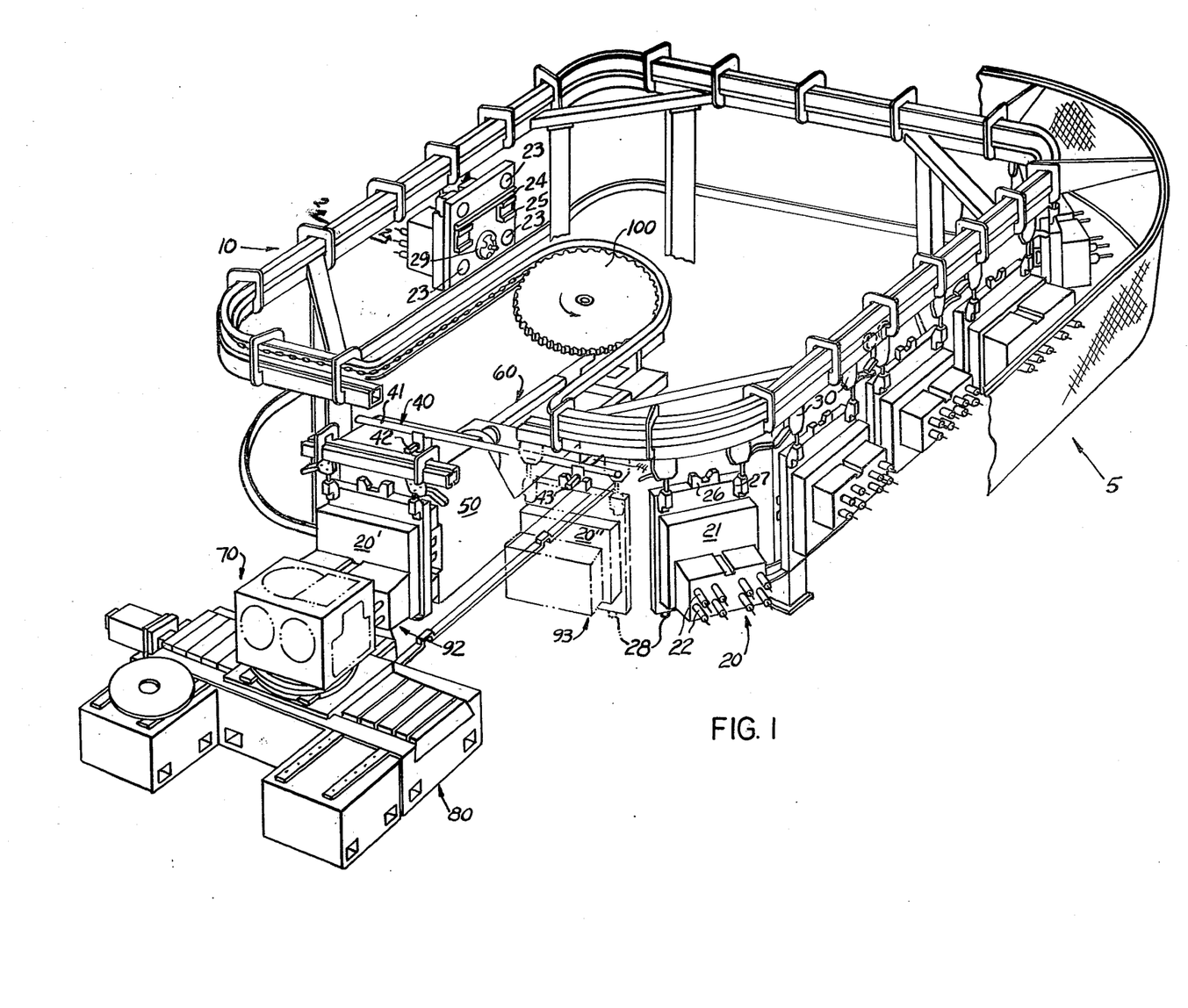
FIG. 1 is a perspective view of the tool changing apparatus constructed in accordance with one embodiment of the invention; with the tool carrier positioned for working on a workpiece.

As shown in FIG. 1, the tool changing apparatus 5 includes a looped conveyor system 10 for moving, in a generally clockwise direction, tool heads 20 which are suspended from the conveyor system by a trolley system 30. A shuttle bar assembly 40 is provided for moving one tool head 20 into a position carried on a face of the tool carrier 50, while simultaneously moving a second tool head out of the position on the tool carrier 50. The tool carrier 50 is movable in and out in a generally horizontal direction by a tool drive assembly 60 toward a workpiece 70. The workpiece 70 is positioned and held by a suitable workpiece delivery system 80. The tool carrier 50 is shown located at a work station 92, that is, in position proximate to the workpiece 70. A conveyor drive sprocket 100, driven by a motor (not shown) in the direction of the arrow, serves to drive the conveyor system 10.

The tool heads 20 generally consist of a tool frame 21 which has a forward side and a reverse side. The forward side is on the outside of the loop of the conveyor system 10 and is the working side of the tool head 20, containing the tool work elements 22, which project horizontally from the forward face. The type of tool work elements 22 (which are referred to as spindles), the number of work elements, and their location are determined by the requirements for machining the workpieces 70 and the relative position of a particular tool head in the sequence of operation. Each tool head 20 contains tool work elements 22 of only one type of tooling for performing only one of the machining functions, but may have multiple spindles for simultaneously machining on the workpiece at multiple locations.

The reverse side of the tool head 20 includes the structure necessary for the coupling of a tool head 20 with the tool carrier 50. Locating pads 23 are made from heat-treated, hardened steel and are located toward the corners of the reverse side of the tool frame 21. The locating pads 23 allow quick, solid seating of the tool head 20 on the tool carrier 50 without damage to the tool head 20. A guide rail 24 and a pair of alignment-clamp guides 25 are provided for the coupling of the tool head 20 to the tool carrier 50.

Each tool head 20 carries a shuttle bar guide 26 on the top surface of the tool head for engaging the shuttle bar assembly 40. A pair of carrier blocks 27, shown disposed on the forward side of the tool head 20 near the top of the tool frame 21, are provided for coupling the tool head 20 to the trolley system 30. A drive receptacle 29 is provided on the reverse side of the tool head 20 for receiving a rotational drive force from the tool drive assembly 60 when the tool head is carried on the tool carrier 50. The drive receptacle 29 on a particular tool head is operatively connected in known manner to the tool work elements 22 on that tool head so that the rotational drive from the tool drive assembly 60 operates to drive the tool work elements 22 at a preselected rotational speed relative to the rotational speed of the rotational drive.

Cam followers 28 are located on the lower edge of the tool heads 20.

The shuttle bar assembly 40 consists generally of a shuttle bar 41, a first guide engaging pin 42, a second guide engaging pin 43 and a shuttle bar movement arm 44 (which is only partially visible in FIG. 1). The first and second guide engaging pins 42, 43 are located to engage the shuttle bar guides 26 on two tool heads 20.

The shuttle bar assembly 40 is preferably of the type which is described in U.S. Pat. No. 3,892,137 to Menzel and assigned to the assignee of the present application. That patent is for a "Transfer Bar Drive Mechanism" and the disclosure contained in that patent is hereby expressly incorporated by reference.

The shuttle bar 41 is rotatable about its axis and translate along the direction of its axis in a generally horizontal plane. Both the rotational and translational movements of the shuttle bar 41 are controlled by the movement arm 44. The shuttle bar assembly 40 is operative to translate horizontally at the approximate rate of 2 feet per second while moving two tool heads.

Figures 2, 3, 4:
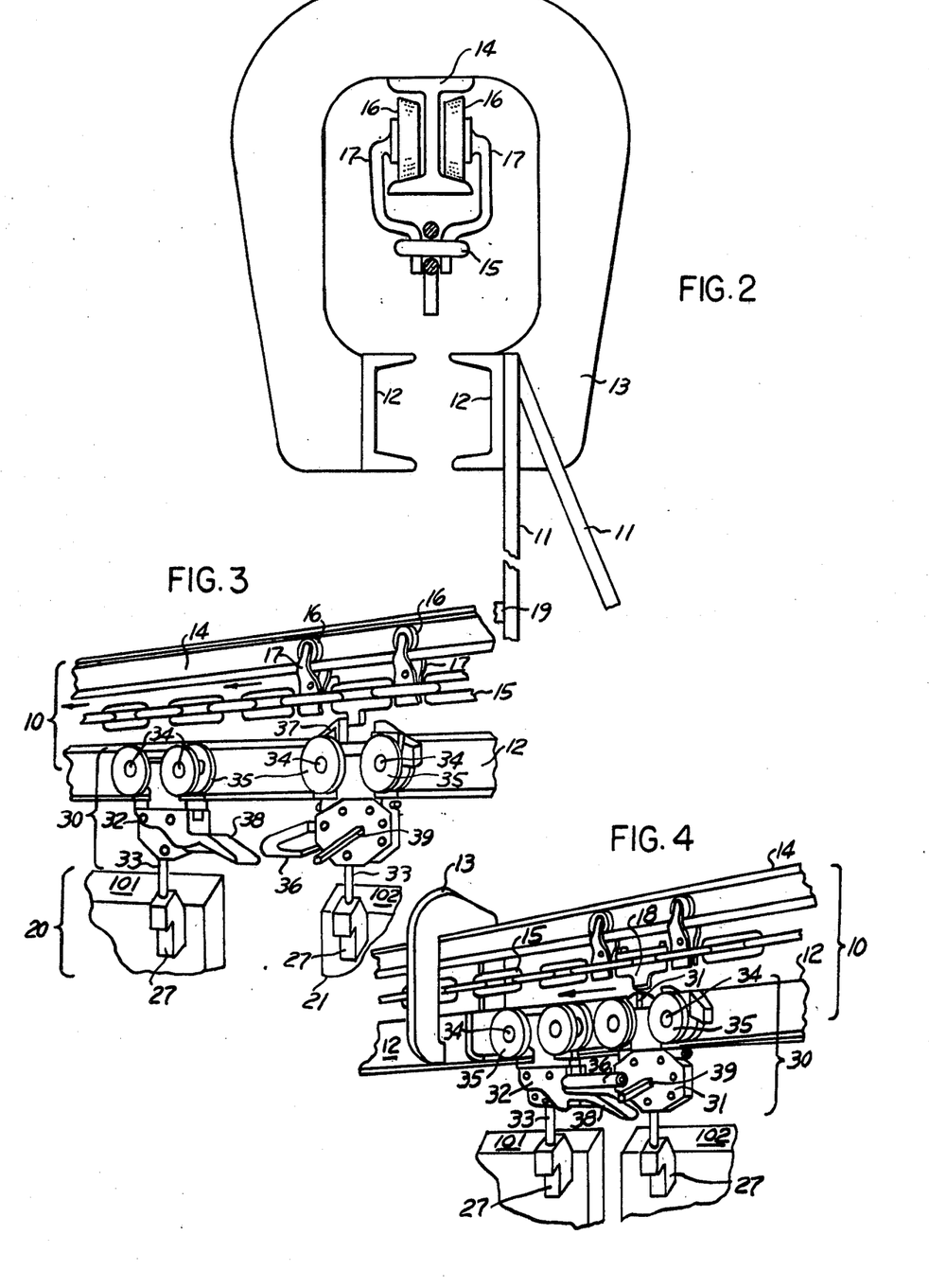
FIG. 2 is an enlarged view of the conveyor system as seen in the direction of the arrows from line 2—2 in FIG. 1.
FIGS. 3 and 4 show some details of the trolley system and conveyor system, with a portion of the conveyor system fragmented away.

FIG. 2 shows details of the structure of the conveyor system 10. The conveyor system 10 includes supports 11, carrying a trolleyway 12, which is preferably shaped as two horizontally-extending U-shaped beams and formed in a loop. The trolleyway 12 carries C-support bracket 13 which extends above the trolleyway 12 at spaced intervals. The C-support brackets 13 support a chain guide 14, which in turn supports a chain 15 through wheels 16 and chain supports 17. The chain guide 14 is an I-beam disposed directly above and generally parallel to the trolleyway 12. The chain supports 17 and wheels 16 are located at a plurality of locations along the length of the chain 15 to maintain the chain 15 at a uniform elevation above the trolleyway 12. The wheels 16 are mounted to the supports 17 with ball bearings to minimize the friction of the moving chain.

At spaced intervals along the chain 15, a block 18 is fixed to move with the chain 15 and extends downwardly from the chain. The blocks 18 are the trolley system for moving the tool heads suspended from the trolley system.

The chain 15, the block 18, the wheels 16 and the chain supports 17 are the moving portion of the conveyor system 10. The chain 15 is operatively connected to the conveyor drive sprocket 100 (shown in FIG. 1) to move the chain 15 continuously along the length of the trackway 12 at a constant rate of speed which is advantageously about one half foot per second.

A lower rail 19 is carried on one of the supports. The lower rail 19 is located below the trolleyway 12 to support the reverse side of the tool heads 20 and maintain the tool heads in a generally uniform orientation approximately perpendicular to the trolleyway 12. The cam followers 28 on the lower portion of the tool heads 20 ride on the lower rail 19, rotating as the tool head is moved along the trolleyway 12.

Referring now to FIGS. 3 and 4, the trolley system 30 couples the tool heads 20 to the trolleyway 12. Two trolley trucks, a leading trolley truck 31 and a trailing trolley truck 32 are associated with each tool head. Portions of two tool heads 101, 102 are shown to disclose the detailed structure of the trolley system 30 which is associated with each tool head and a portion of the conveyor system 10 which interacts with the trolley system 30. The tool head 102 is shown with only its leading portion and the leading truck 31, while the tool head 101 is shown with only its trailing portion and the trailing truck 32.

Each trolley truck has a head carrying rod 33 extending downwardly from the truck. The rod 33 is attached to the carrier block 27 on the tool head.

The tool heads 20, carried on the trucks 31, 32 are movable along the trackway 12 in the direction of the arrows in FIGS. 3 and 4. The trucks 31, 32 are carried on axles 34 and wheels 35 which together couple the tool heads 101, 102 to the trackway 12. The wheels 35 on the trolleys 31, 32 are mounted to the axles 34 with ball bearings to minimize friction. The reduced friction allows the motor driving the chain 15 to be smaller and allows for more efficient operation.

The leading truck 31 of the tool head 102 carries a probe 36 extending in the direction of the arrows beneath the trackway 12. The probe 36 is pivotally mounted to the leading truck 31 so that the distal end of the probe 36 is free to move vertically between a first position and a second position. In the first position, as shown in FIG. 3, the distal end of the probe 36 is in its down position, while in the second position, as shown in FIG. 4, the distal end of the probe 36 is in its up position.

The leading truck 31 carries a projection 37 which extends upwardly above the wheels 35 for selectively engaging the block 18 carried on the chain 15. The projection 37 has two positions, an upwardly-extending position for engaging the block 18, as shown in FIG. 3, and a retracted position which does not engage the block 18, as shown in FIG. 4. The projection 37 is responsive to the position of the probe 36, in that when the probe is in its first position, then the projection 37 is in the upwardly-extending position (as shown in FIG. 3). When the probe 36 is in its second position, then the projection 37 is in the retracted position (as shown in FIG. 4).

For the conveyor system 10 and the trolley system 30 to coact in the desired manner, the vertical height of the chain 15 must be relatively accurate and uniform with respect to the trolleyway 12. The block 18 must engage the projection 37 firmly when the projection is in the upwardly-extending position (of FIG. 3) and the block 18 must not engage the projection 37 when the projection is in the retracted position (of FIG. 4). The chain supports 17 and the wheels 16 maintain the chain 15 and block 18 at the proper height above the trolleyway 12. Additional supports 17 and wheels 16 are positioned along the chain 15 at uniform intervals of a few feet.

The trailing truck 32 on each tool head carries an inclined guide 38 extending opposite to the arrows indicating the direction of tool head travel. The inclined guide 38 is fixed to the trailing truck 32 of tool head 101 for receiving the probe 36 carried on the other tool head 102 when the tool head 101 is stationary and the tool head 102 is moving. Upon contact with the probe 36, the guide 38 urges the distal end of the probe 36 upward to its second position.

The loading truck 31 also carries a finger 39 which extends out to the side in the preferred embodiment. The finger 39 is fixed in place and serves to engage trackway stops to be described later.

The trolley system 30 and the conveyor system 10 are preferably chosen to be an Acco MHS-brand power-and-free conveyor system.

Figure 5:
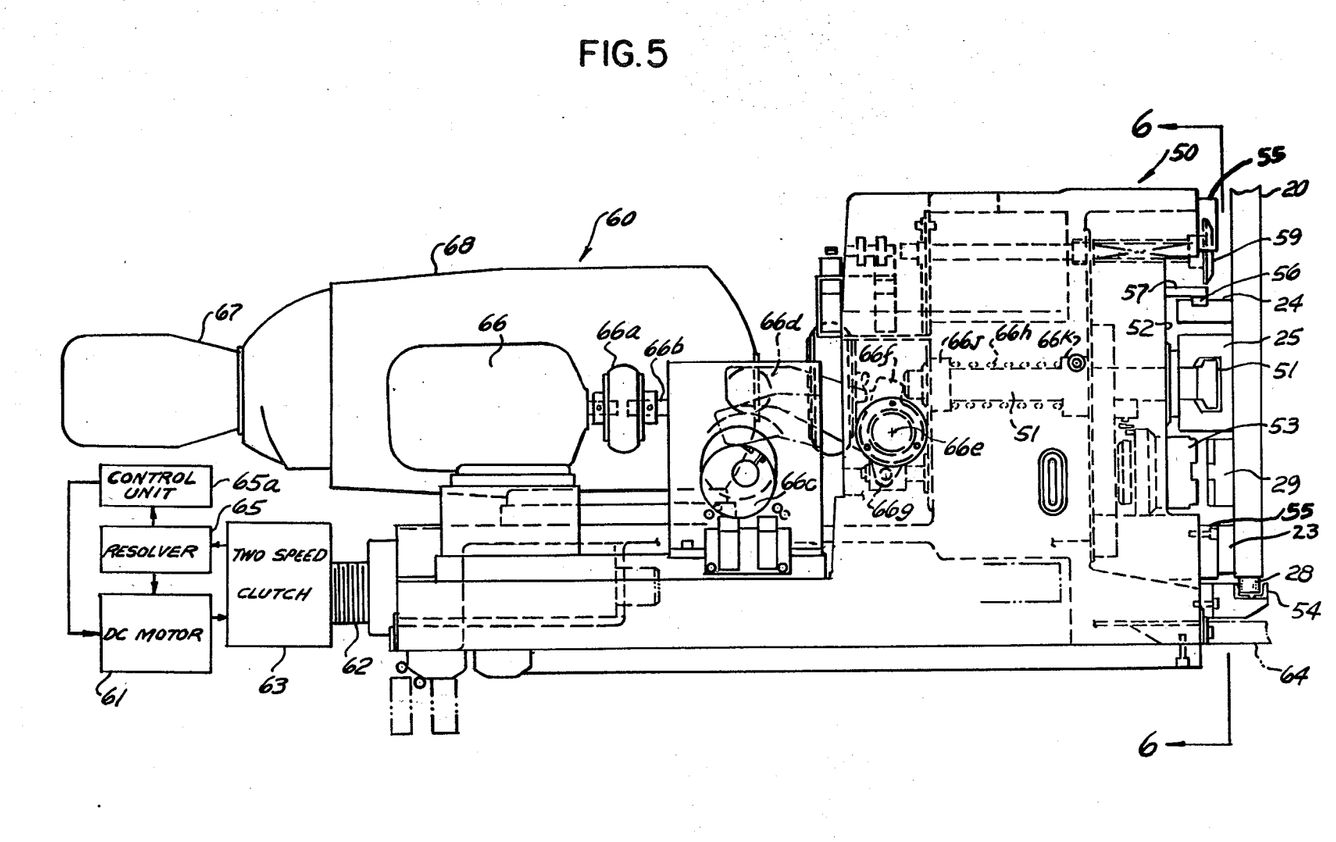
FIG. 5 shows a side view of the tool carrier and tool drive assembly.

FIG. 5 shows a side view of the tool carrier 50 and the tool drive assembly 60 and a portion of a tool head 20 carried on the tool carrier 50. The tool carrier 50 has structure to receive and clamp one tool head in tight contact for moving the tool head in and out and for driving the tool work elements or spindles 22. The tool carrier 50 has a locating clamp 51 for receiving the clamp guides 25 on each head 20. The tool carrier 50 carries a second locating clamp which is directly behind and hidden by the locating clamp 51 in FIG. 5. The clamps 51 are movable between an unclamped position (shown in solid) and a clamped position (shown in phantom), which holds the tool head clamp guide 25 in tight contact with a face 52 of the tool carrier 51. The locating clamps are in the unclamped position during loading and unloading of the tool heads 20 onto and off of the tool carrier 50, and are in the clamped position for moving a tool head 20 to the workpiece and for working on the workpiece.

The tool carrier 50 has a rotating drive coupling 53, located to couple with the drive socket 29 carried on the tool head 20 when the tool head is on the tool carrier 50 in the clamped position. The drive coupling 53 has ridges and recesses which are complimentary with the socket 29 for a slip-free drive once the complementary surfaces are mated.

A rail 54 at the lower portion of the tool carrier 50 for receiving the cam follower 28 is carried on the lower portion of the tool head 20. This rail supports the tool head 20 during loading and unloading of tool heads and insures proper alignment of the tool head 20 for clamping.

The tool carrier 50 includes a plunger 59 for control during a machining operation of tapping. The plunger 59 is spring-mounted within the tool carrier 50 for engaging a backwardly-moving tapping element and allowing the tapping to continue until that element has moved the desired distance, then stopping the machining.

The tool carrier 50 has a plurality of cam followers 56 (only one shown in FIG. 5) and cam follower supports 57 for engaging the guide rail 24 on each tool head 20 during loading and unloading. The cam follower 54 assists the locating clamps 51 in supporting, aligning and maintaining the tool heads at the proper height and location during loading and unloading.

The tool drive assembly 60 includes a d.c. motor 61 driving a ball screw drive 62 through a two-speed clutch 63. The ball screw drive 62 moves the tool carrier 50 back and forth along the rails 64. A resolver 65 is coupled to the ball screw drive 62 within the clutch 63 housing for measuring the position of the tool carrier 50 along the rails 64 by measuring the direction and the rotational displacement of the ball screw drive 62. A control unit 65a is coupled to the resolver 65 for engaging and disengaging the motor 61.

The d.c. motor 61 used in the preferred embodiment of this invention is rated approximately 5 hp.

The two-speed clutch 63 provides a fast and a slow infeed (and outfeed) speed for the tool carrier 50. The fast speed with a correspondly lower torque is used for moving the tool carrier 50 to the workpiece for machining and for moving the tool carrier back from the workpiece after machining while the slower speed with a correspondingly higher torque is used during the machining.

The control unit 65 receives an input of the desired movement of the tool carrier 50. When the desired movement of the ball screw drive 67 is achieved as is indicated by the resolver 65, then the d.c. motor 61 is switched to a holding torque for maintaining the ball screw drive 62 stationary by an appropriate signal from the control unit 65a. The control unit 65a could also be used to reverse the d.c. motor when the tool carrier 50 reaches the desired position, if that is desired.

The tool drive assembly 60 also includes a clamping motor 66 for moving the clamps 51 in and out for clamping and unclamping of tool heads 20 to the tool carrier 50. The clamping motor 66 is an a.c. brake motor, rated at approximately 2 hp. coupled through a dodge para-flex coupling 66a and an output shaft 66b to a cam wheel 66c. The cam wheel 66c moves between a first position (shown in solid lines) and a second position (shown in dotted lines). A lever arm 66d, pivotally mounted to support 66e and carrying two projections 66f, 66g, rides on the cam wheel 66c. The lever arm 66d and the projection 66f serve to clamp and unclamp the clamps 51 by releasing and compressing, respectively, a spring 66h which surrounds the shafts of the clamps 51. The spring 66h, is, in the preferred embodiment, a plurality of disc-shaped springs, captivated between an enlarged collar portion 66j on the shafts of the clamps 51 and a fixed portion 66k on the tool carrier 50.

Clamping and unclamping of tool heads is accomplished by the action of the clamping motor 66 on the cam wheel 66c. When the cam wheel 66c is in the first position, the lever arm 66d is in its lower position and the projection 66f is in its retracted position. The spring 66h is released and not held by the projection 66f, allowing the spring 66h to retract the clamps 51 into its clamped position, holding the clamp guides 25 and the tool head 20 in tight contact with the face of the tool carrier 50.

When the cam wheel 66c is in its second position, the tool head is unclamped from its position on the tool carrier 50. The movement of the cam wheel 66c to the second position moves the lever arm 66d to its upper position, which moves the projection 66f to its forward-position, where the projection 66f moves the enlarged collar portion 66j and the clamps 51 forward, compressing the spring 66h. The forward movement of the clamp 51 releases the clamp guides 25 on the tool head 20.

The second projection 66g carried on the lever arm 66d controls the axial position of the rotary drive coupling 53. When the tool head 20 is clamped to the tool carrier 50, the second projection 66g is in its forward position, where it moves the coupling 53 into engagement with the drive socket 29 on the tool head 20.

When the tool head 20 is unclamped, the second projection 66g is moved backward to allow the drive coupling 53 to disengage from the drive socket 29 in preparation for the unloading of the tool head 20 from the tool carrier 50.

The d.c. motors 67, 68 drive the tool work elements (spindles) carried on the tool head 20 through the drive coupling 53 and the drive socket 29. The motor 67 is a smaller motor, preferably on the order of 1 hp. for rotating the drive coupling 53 at a very slow speed until the drive coupling 53 has completely engaged the complimentary surfaces of the drive socket 29. Once complete engagement is obtained and sensed, the motor 68 is used to drive the spindles. The motor 68 is the primary drive motor and is rated at approximately 30 hp.

Figure 6:
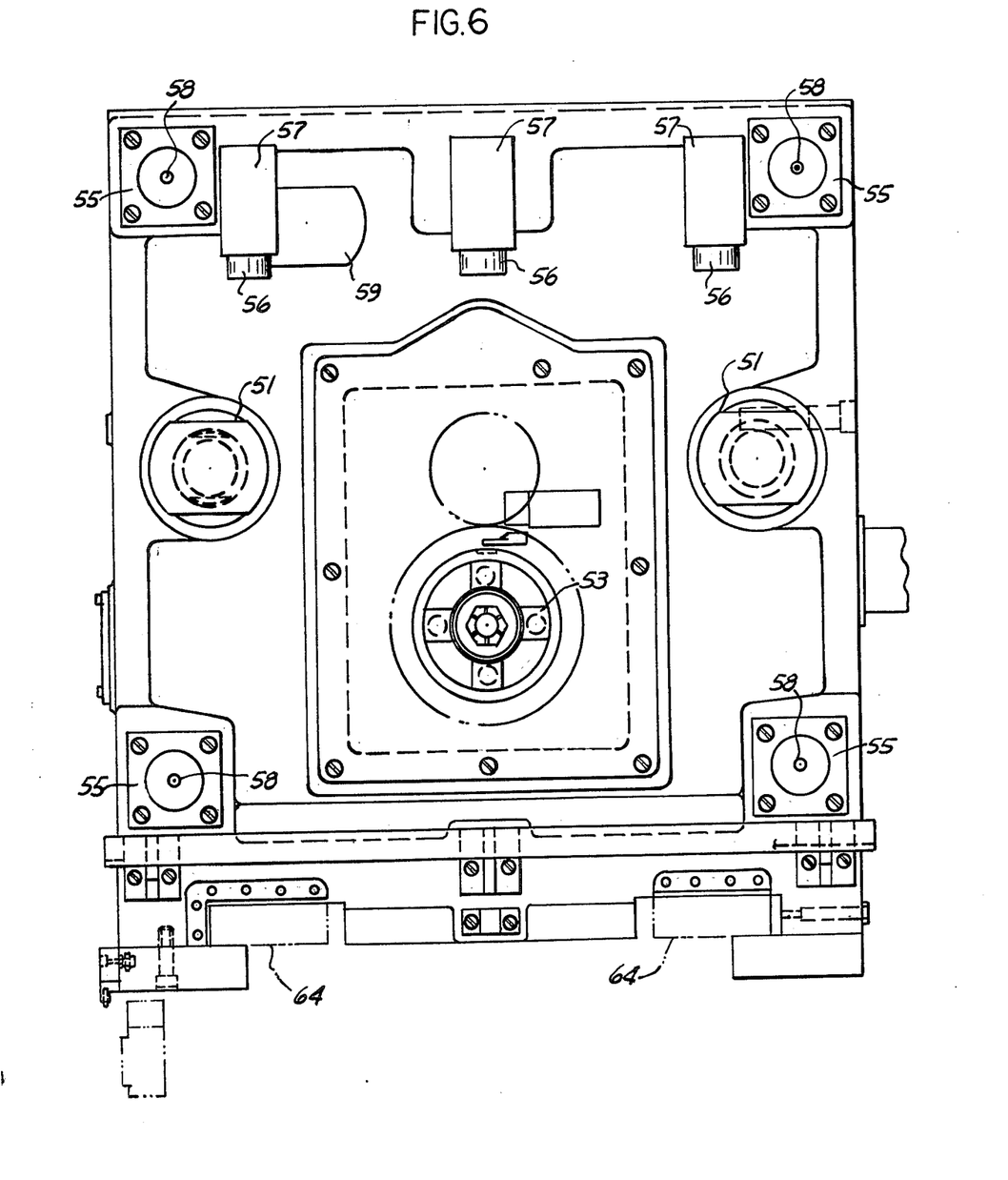
FIG. 6 shows a front view of the tool carrier, as seen in the direction of the arrows from line 6—6 in FIG. 5.

FIG. 6 shows a front view of the tool carrier 50, showing the face 52 of the tool carrier and the rails 64 on which the tool carrier 50 rides. Located near the corners of the face are hardened pads 55 for seating the locating pads 23 of the tool heads 20. The pair of locating clamps 51, three sets of cam followers 56 and cam follower supports 57 and the rotating drive coupling 53 are shown in this figure.

Located within the region of the hardened pads are air surfaces 58, through which air under pressure is delivered during the clamping and unclamping of tool heads to the tool carrier 50. The air is preferably under approximately 50 psi pressure and serves three functions: it cleans the hardened pads 55 and the locating pads 23 to insure better seating when the tool head is clamped to the tool carrier 50; the air serves as an air bearing during loading and unloading; and the air pressure is monitored and serves as a switch to indicate when clamping has occurred.

The tool drive assembly 60 may be manually controlled or automatically controlled to start and stop the machining operations. In an automatically controlled operation, the number of revolutions of the drive assembly could be counted to position the tool carrier at the work station, then switched to the slow speed for working. The working would continue until an indicated number of drive assembly revolutions had been completed, indicating a desired amount of machining (such as a desired depth of drilling) has been completed. Then the direction of drive on the tool carrier would be reversed and the tool carrier would be moved back to the load station 91 by counting the revolutions.

Figure 7:
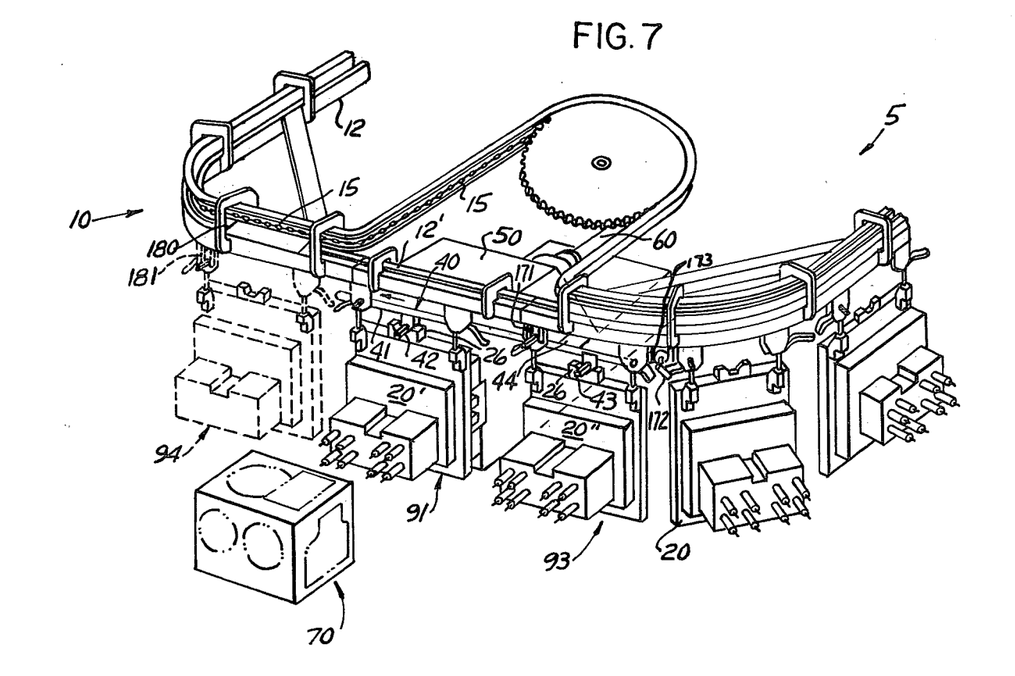
FIG. 7 shows an enlarged, fragmentary perspective view of a portion of the tool change apparatus of FIG. 1 with the tool carrier positioned for the loading and unloading of tool heads.

FIG. 7 shows a portion of the tool changing apparatus 5 of the present invention is an enlarged view. The tool carrier 50 carrying a tool head 20' is shown at a load station 91. The tool head 20' carries a portion of removable trolleyway 12' which completes the looped trolleyway 12 when the tool carrier is at the load station 91. Two trackway stops 171, 172 are shown in a position to engage the tool heads 20'', 20. The stops 171, 172 are pneumatically controlled by cylinders (not shown) to selectively release the tool heads. The stop 171 is located to stop the tool head 20' at a position along the trolleyway 12 where the probe 36 on the tool head 20" would not engage the chain 15 (the chain 15 is behind the probe 36 and moving toward the sprocket 100). The stop 171 merely stops the momentum of the tool head 20" by captivating the finger 39 carried on the tool head 20".

The stop 172 must not only stop the momentum of the tool head 20 but also disengage the projection 37 on the tool head 20 from the moving chain 15. The stop 172 is accordingly designed and positioned in front of the leading truck 31 of the tool head 20 as if it were an inclined guide 38 of a tool head immediately in front of the tool head 20.

A tool head is shown in phantom at a discharge station 94, the location where a tool head is positioned after being unloaded from the tool carrier 50. Above the discharge station 94 between the trolleyway 12 and the chain 15 is a cam blade 180. The blade 180 is selectively positioned to prevent the projection 37 of the discharged tool head from engaging the moving chain 15 while the tool head is being moved by the transfer bar assembly 40. A limit switch 181 is located at the discharge station 94 for sensing when a tool head is fully moved out of the discharge station.

The workpiece delivery system 80 shown in FIG. 1 could be any of a number of conventional workpiece holders with means for clamping the workpiece down. A cross slide arrangement with rotating index table and a pallet changer is shown in FIG. 1 as perhaps one of the more versatile arrangements. The workpiece delivery system 80 could also be a center-base table or a cross slide table or a rotating index table. The type of workpiece delivery system depends upon the type of workpiece 70 being machined, the number of sides requiring machining, and the availability and desirability of manual labor to perform workpiece manipulation and changing.

OPERATION

The system operates in the following manner, as shown with reference to FIGS. 1 and 7. Referring first to FIG. 1, a tool head 20' is carried on the tool carrier 50 at the work station 92. The tool work elements 22 are performing the machining operation on the first surface of the workpiece 70 facing toward the tool carrier 50. The tool head 20" is positioned at one end of the conveyor system 10 (a feed station 93), with its shuttle bar guide 26 engaging the second guide engaging pin 43. The stop 171 has captivated the finger 39 on the tool head 20" and has stopped the momentum of the tool head 20". The chain 15 does not pass over the probe 36, so it does not try to move the tool head 20". The shuttle bar 41 rotates to engage the shuttle bar guide 26 on the tool head 20" with the second guide engagement pin 43, then the stop 171 is removed (as the shuttle bar holds the tool head 20" in place).

When machining with the tool head 20' is complete, the tool drive assembly 60 retracts the tool carrier 50 and the tool head 20' to the load station 91 as shown in FIG. 7. The tool drive assembly, in bringing the tool head 20' and tool carrier 50 from the work station 92 to the load station 91, operates at the fast speed to minimize the time during which no machining was occurring. As the tool head 20' is retracted, the shuttle bar guide 26 engages the first guide engaging pin 42.

When the tool head 20' is at the load station 91, the segment of removable trolleyway 12 is positioned to complete the loop of the trolleyway 12 to form a completed loop for trolley movement. The locating clamps 51 on the tool head move from the clamped position to the unclamped position. (The stop 171 has already been moved away from tool head 20'). The shuttle bar assembly 40, with the pin 42 in the shuttle bar guide 26 of tool head 20' and with the pin 43 in the shuttle bar guide 26 of a tool head 20" to be loaded, moves in the direction of the arrow in FIG. 7 to change the tool head carried on the tool carrier. The tool head 20' which had been carried on the tool carrier 50 is moved to a discharge station 94 and the tool head 20" which had been at the feed station 93 is moved to a load station 91, the position where it is carried on the tool carrier 50. The projection 37 on the tool head 20', while being moved, is engaged by the cam blade 180 to prevent its engagement of the chain 15 until the transfer bar assembly 40 disengages from the head 20'.

After transferring the tool heads 20', 20" to the discharge station 94 and the load station 91, respectively, the stop 171 is repositioned, while the stop 172 is then released. The shuttle bar arm 44 on the shuttle bar assembly 40 then rotates to disengage the pins 42, 43 from the shuttle bar guide 26 on each tool head. With the pins so disengaged, the shuttle bar translates to its original position.

The locating clamps on the tool carrier move to the clamped position to secure tool head 20" to the tool carrier 50.

After the tool head 20" has been moved onto the tool carrier 50, the feed station 93 is vacant and the tool head 20 no longer has a tool head immediately in front of it and the stop 172 is released. The lack of a tool head immediately in front of tool head 20 and the release of the stop 172 permits the probe 36 carried on the tool head 20 to move from its second position to its first position, thereby causing the projection 37 carried on the leading truck 31 of this tool head to engage the block 18 on the moving chain 15 and thereby move the tool head 20 to the feed station 93. While the tool head 20 is advanced toward the feed station 93, the finger 39 on the tool head 20' engages a limit switch 173, at which time stop 172 is repositioned. When the tool head 20 is at the feed station 93, the shuttle bar 41 is rotated so that the pin 43 engages the shuttle bar guide 26 on the tool head 20. The stop 171 is then opened.

Each succeeding tool head (the tool heads behind the tool head 20 in FIG. 7) responds to the movement of the tool head immediately in front of it in a similar manner so that each tool head in due course will advance one position as a result of the movement by the transfer bar assembly 40 of the tool head at the feed station onto the tool carrier.

The tool head 20', which was moved to the discharge station 94, has no tool head in front of it, so the probe 36 on the tool head 20' will move to the first position when cam blade 180 is removed. The cam blade 180 is controlled in response to the disengagement of the shuttle bar pin 42 from the tool head 20' at the discharge station 94. The projection 37 then moves to the upwardly-extending position to engage the moving chain. The tool head is moved by the chain 15 until it reaches the end of the queue of tool heads. In this manner, the tool heads are cycled for performing a sequence of operations repeatedly on workpieces.

If five sequential operations are to be performed on each workpiece, five tool heads would be required. They would be located on the trolleyway 12 in the order that they are to be used. After the fifth tool head had been used, the machining on the workpiece would be complete and a new workpiece would be placed near the work station for the cycle to be repeated.

The cam blade 180 and stops 171, 172 are controlled in a known manner, as by placing switches at strategic locations to sense the presence of the tool head or the transfer bar. The cylinders controlling the cam blade 180 and the stops 171, 172 would be responsive to the switches. The cylinders might also be responsive to timed signals triggered by a system event.

ALTERNATE EMBODIMENT

Figure 8:
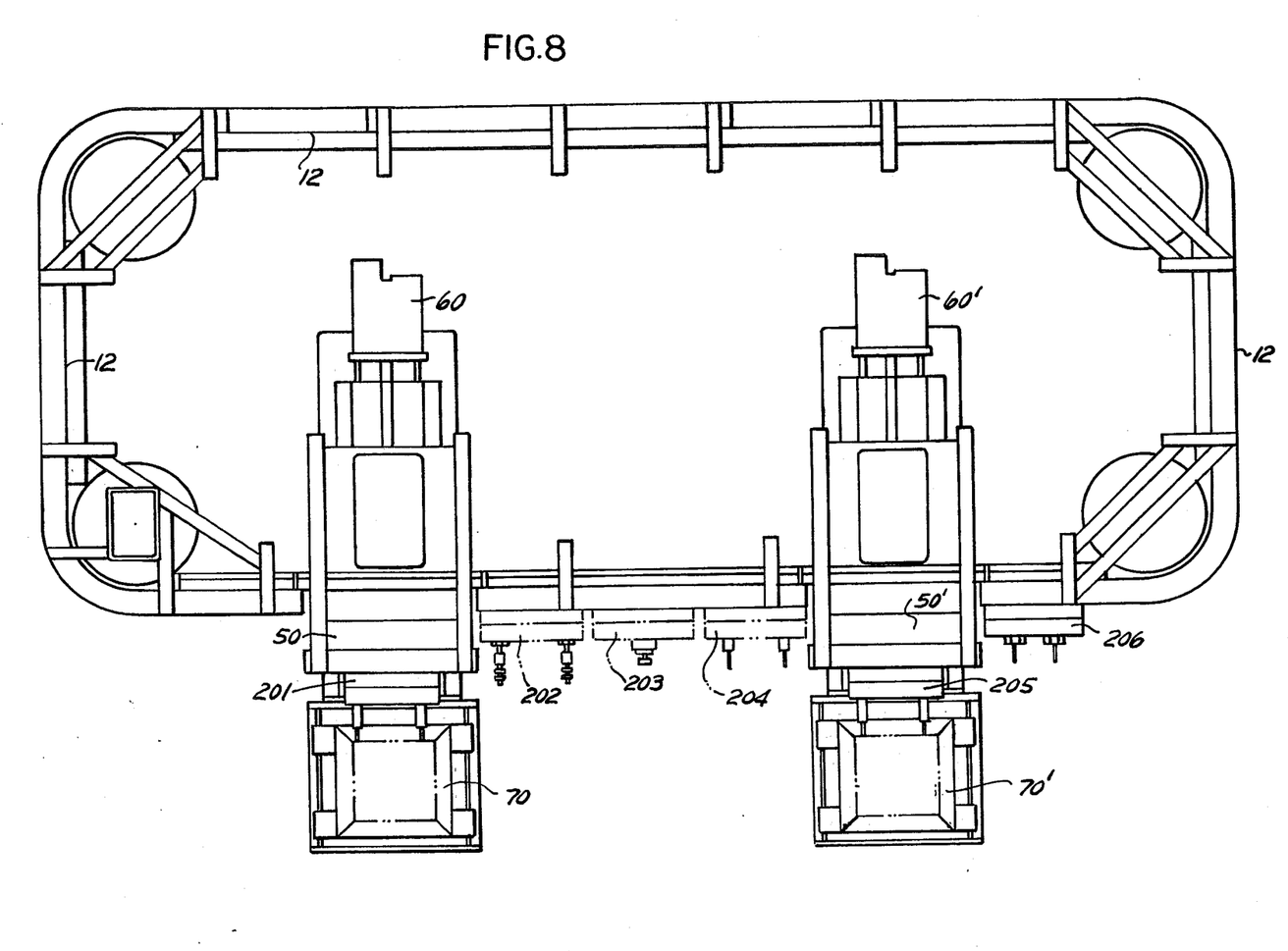
FIG. 8 shows a plan view of an alternative embodiment of the tool changing apparatus using two tool carriers operating independently of each other but using common tools.

An alternate embodiment of the present invention is shown as FIG. 8 in a plan view. This embodiment uses two tool carriers 50, 50' operating independently of each other but using the same tool heads and located about a common trolleyway 12. Each tool carrier 50, 50' operates on different workpiece 70, 70' and has a separate shuttle bar assembly (not shown) and tool carrier drives 60, 60'. Each of the tool carriers carries each of the tool heads 201-206 in the same sequence, but at any time each carrier is at a different part of the sequence.

It will be appreciated that other trolleyway systems could be used advantageously. The trolleyways might include spur tracks or siding tracks to allow easy shifting of tool heads. Tool heads on the trackway might easily be stopped for inspection of the spindles and repair or replacement as needed.

While a preferred embodiment and an alternate embodiment of the invention have been disclosed, it will be apparent to those skilled in the art that changes may be made to the invention as set forth in the appended claims and, in some instances, certain features of the invention may be used to advantage without corresponding use of other features. For example, other conveyor systems and trolleys could be used while obtaining advantageous features of the present invention. Other known transfer systems could replace the disclosed transfer bar. Accordingly, it is intended that the illustrative and descriptive materials herein be used to illustrate the principles of the invention and not to limit the scope thereof.

What is claimed is:

1. In an apparatus for machining a workpiece at a workpiece station with a changeable tool head sequentially carried by a tool carrier movable between the workpiece station and a loading station, apparatus for sequentially changing the tool head carried by the tool carrier comprising:
   a frame;
   a track carried by the frame, said track having along its length positions defining a feed station, a load station and a discharge station;
   a chain supported by the frame and disposed near the track;
   a motor coupled to the chain for driving the chain in a chosen direction;
   a plurality of tool heads movably positioned on the track, each tool head carrying means for engaging the chain and means for sensing proximity to another tool head in the chosen direction and coupled to the chain-engagement means for disengaging the tool head from the chain when proximity to another tool head in the chosen direction is sensed by the sensing means;
   means for moving the tool carrier between the workpiece station and the loading station; and
   means responsive to the movement of the tool carrier to the loading station for engaging the tool head carried by the tool carrier at the loading station and a second tool head located at the feed station and for moving said heads simultaneously to the discharge station and to the loading station, respectively.

2. An apparatus for changing tool heads comprising:
   a frame;
   a plurality of tool heads;
   means for moving a tool head comprising:
      a moving member carried by the frame and disposed near each tool head; and
      drive means coupled to the moving member for driving the moving member in a preferred direction;
   means for controlling the movement of a tool head by the moving means, said controlling means comprising:
      a probe carried by each tool head extending in a preferred direction of travel;
      a projection having a first position engaging the moving member and a second position not engaging the moving member;
      a coupling extending between the projection and the probe for moving the projection into the first position when the probe does not engage another tool head in the preferred direction of travel and for moving the projection into the second position when the the probe engages another tool head in the preferred direction of travel;
   a tool carrier movable from a station for loading tool heads, proximate to the moving member;
   means for stopping tool head motion at the station for loading, comprising a gate for engaging the probe carried by each tool head and a means for controlling the gate in response to the movement of the tool carrier; and in response to the movement of the tool carrier; and
   means for changing the tool head carried on the tool carrier at the station for loading, comprising:
      a movable bar located near the station for loading and extending toward a tool head engaged at said stopping means;
      first and second projections carried on the movable bar for engaging respectively the tool head carried on the tool carrier and the tool head engaged at said stopping means;
      drive means coupled to the movable bar for moving the movable bar and the tool heads engaged by the projections, whereby said changing means is driven to move a tool head from the tool carrier to the tool head moving means and a tool head from the station for loading tool heads to the tool carrier simultaneously while engaged by the projections carried on the movable bar.

3. A machining center having a plurality of tool heads for performing machining operations on a stationary workpiece, the center comprising:
   a fixed track defining a first path between a first station and a second station;
   a movable track having a first position defining a second path between said first station and said second station, said movable track cooperating with said fixed track to define an endless pathway when said movable track is in the first position;

means for holding the workpiece at a second position located adjacent said movable track and said endless pathway;

a plurality of tool heads;

means for supporting and controllable moving said tool heads around said endless pathway individually so that each tool head may be moved individually from the fixed track onto the movable track and from the movable track back onto the fixed track; and means for moving said movable track between the first position and the second position and activating said tool head driving means when a tool head is on said movable track to machine said workpiece located in said workpiece holding means at said second position.

4. A machining center of type described in claim 3 wherein the means for moving said movable track moves generally horizontally between said first and second positions.

5. A machining center of the type described in claim 4 wherein the workpiece has first and second sides to be machined and the means for holding the workpiece at the second position includes means for rotating the workpiece about a vertical axis after the first side is machined to expose said second side to be machined.

6. A machining center of the type described in claim 4 wherein the means for moving the track between the first and second positions and activating said tool head driving means includes a slidably mounted carriage.

7. A machining center of the type described in claim 5 wherein the means for moving the track between the first and second positions and activating said tool head driving means includes a slidably mounted carriage.

8. A machining center of the type described in claim 3 wherein the means for supporting and moving said tool heads around the endless pathway includes a first means for moving tool heads individually along the first path at a first speed and a second means for moving tool heads along the second path at a speed greater than the first speed.

9. A machining center of the type described in claim 4 wherein the means for supporting and moving said tool heads around the endless pathway includes a first means for moving tool heads individually along the first path at a first speed and a second means for moving tool heads along the second path at a speed greater than the first speed.

10. A machining center of the type described in claim 5 wherein the means for supporting and moving said tool heads around the endless pathway includes a first means for moving tool heads individually along the first path at a first speed and a second means for moving tool heads along the second path at a speed greater than the first speed.

11. A machining center of the type described in claim 8 wherein the second means for moving the tool heads includes means for moving one tool head from the movable track to the fixed track along the second path and means for moving a second tool head simultaneously from the fixed track onto the movable track along the second path.

12. A machining center of the type described in claim 9 wherein the second means for moving the tool heads includes means for moving one tool head from the movable track to the fixed track along the second path and means for moving a second tool head simultaneously from the fixed track onto the movable track along the second path.

13. A machining center of the type described in claim 10 wherein the second means for moving the tool heads includes means for moving one tool head from the movable track to the fixed track along the second path and means for moving a second tool head simultaneously from the fixed track onto the movable track along the second path.

14. The machining center of the type described in claim 3 wherein the means for supporting and controllably moving the tool heads along the endless pathway includes means for disengaging a tool head from the moving means to stop the movement of the tool head at predetermined location along the endless pathway.

15. A machining center of the type described in claim 5 wherein the means for supporting and controllably moving the tool heads along the endless pathway includes means for disengaging a tool head from the moving means to stop the movement of the tool head at predetermined location along the endless pathway.

16. A machining center of the type described in claim 11 wherein the means for supporting and controllably moving the tool heads along the endless pathway includes means for disengaging a tool head from the moving means to stop the movement of the tool head at predetermined location along the endless pathway.

17. A machining center of the type described in claim 14 wherein said head moving means moves tool heads in a first direction and each tool head includes means for sensing the proximity of said tool head to another tool head when said tool head is moving in the first direction towards said other tool head and means for disengaging the tool head from the head moving means when proximity in the first direction to another tool head is sensed by the sensing means.

18. A machining center of the type described in claim 15 wherein said head moving means moves tool heads in a first direction and each tool head includes means for sensing the proximity of said tool head to another tool head when said tool head is moving in the first direction towards said other tool head and means for disengaging the tool head from the head moving means when proximity in the first direction at another tool head is sensed by the sensing means.

19. A machining center of the type described in claim 16 wherein said head moving means moves tool heads in a first direction and each tool head includes means for sensing the proximity of said tool head to another tool head when said tool head is moving in the first direction towards said other tool head and means for disengaging the tool head from the head moving means when proximity in the first direction at another tool head is sensed by the sensing means.

* * * * *